United States Patent
Li

(10) Patent No.: US 8,937,792 B2
(45) Date of Patent: Jan. 20, 2015

(54) BUCK CIRCUIT

(71) Applicants: Hong Fu Jin Precision Industry (ShenZhen) Co., Ltd., Shenzhen (CN); Hon Hai Precision Industry Co., Ltd., New Taipei (TW)

(72) Inventor: Ji-Chao Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 47 days.

(21) Appl. No.: 13/787,854

(22) Filed: Mar. 7, 2013

(65) Prior Publication Data

US 2013/0242437 A1  Sep. 19, 2013

(30) Foreign Application Priority Data

Mar. 19, 2012  (CN) .......................... 2012 1 0072375

(51) Int. Cl.
*H02H 7/00* (2006.01)
*H02H 9/02* (2006.01)

(52) U.S. Cl.
CPC ..................................... *H02H 9/025* (2013.01)
USPC .......................................................... 361/18

(58) Field of Classification Search
USPC ............................................................ 361/18
See application file for complete search history.

(56) References Cited

U.S. PATENT DOCUMENTS

| | | | | |
|---|---|---|---|---|
| 5,570,276 A * | 10/1996 | Cuk et al. | ......................... | 363/16 |
| 7,233,132 B1 * | 6/2007 | Dong et al. | .................... | 323/272 |
| 7,365,525 B2 * | 4/2008 | Zhou et al. | ..................... | 323/282 |
| 8,422,233 B2 * | 4/2013 | Li et al. | .......................... | 361/720 |
| 8,604,758 B1 * | 12/2013 | Dong et al. | .................... | 323/271 |

* cited by examiner

*Primary Examiner* — Stephen W Jackson
(74) *Attorney, Agent, or Firm* — Novak Druce Connolly Bove + Quigg LLP

(57) ABSTRACT

A buck circuit includes a first inductor, a second inductor, a first capacitor, a second capacitor, a first resistor, a second resistor, a first electronic switch, a second electronic switch, a controller, a voltage input terminal, and a voltage output terminal. The relationship of the capacitance C of the first capacitor, the resistance R of the first resistor, the inductance L of the first inductor, and the equivalent impedance Z of the first inductor is R*C=L/Z. The controller detects voltage of the first capacitor, determines whether current of the first inductor is more than a preset value according to the voltage of the first capacitor, and executes over-current protection when the current of the first inductor is more than the preset value.

3 Claims, 1 Drawing Sheet

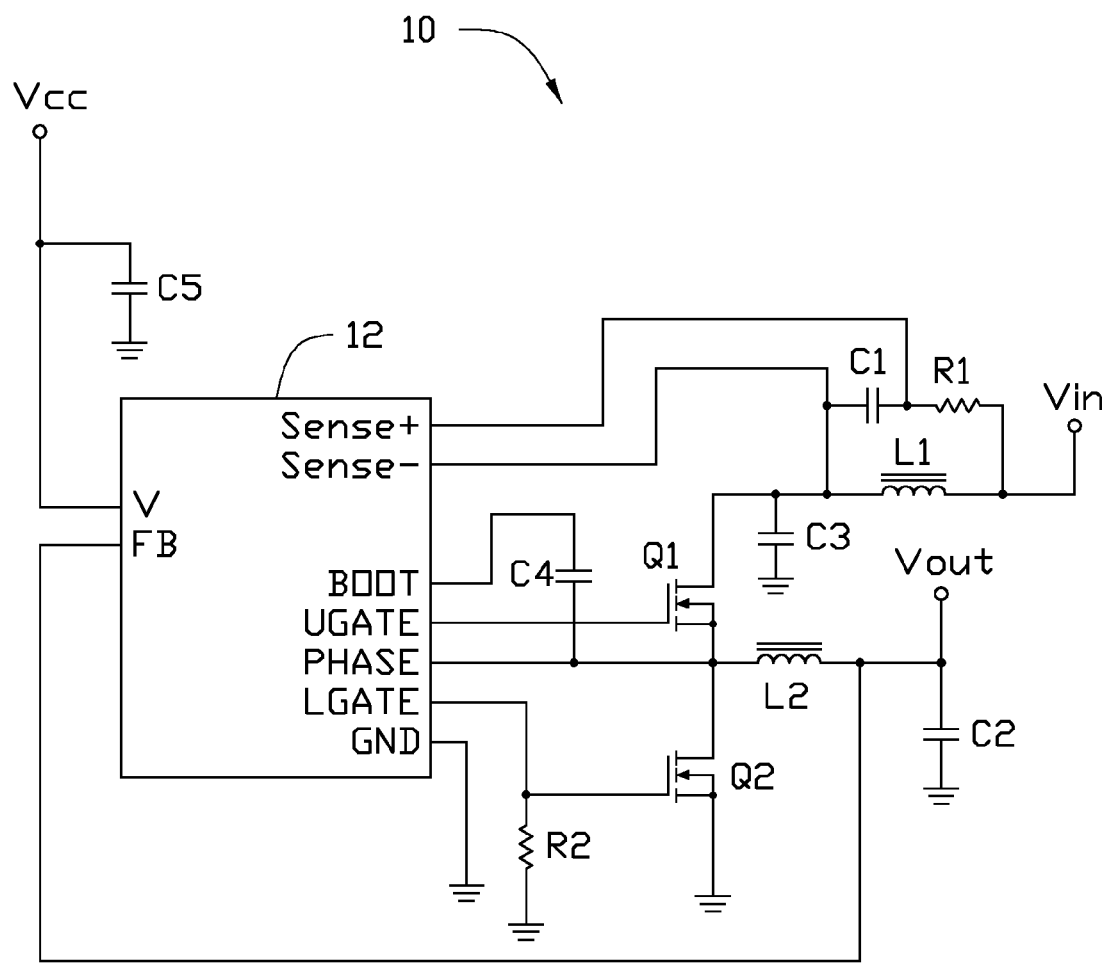

BUCK CIRCUIT

BACKGROUND

1. Technical Field

The present disclosure relates to a buck circuit.

2. Description of Related Art

If current of a buck circuit is over a safe current range, such as in a short circuit state, elements of the buck circuit may be damaged. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the view.

The FIGURE is a circuit diagram of a buck circuit in accordance with an embodiment of the present disclosure.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

The FIGURE shows an embodiment of a buck circuit 10. The buck circuit 10 includes a controller 12, a first electronic switch Q1, a second electronic switch Q2, a first inductor L1, a second inductor L2, a first resistor R1, a second resistor R2, a first capacitor C1, a second capacitor C2, a third capacitor C3, a fourth capacitor C4, a fifth capacitor C5, a voltage input terminal Vin, and a voltage output terminal Vout.

The controller 12 includes a first detecting pin Sense+, a second detecting pin Sense−, a boot pin BOOT, a first control pin UGATE, a state pin PHASE, a second control pin LGATE, a ground pin GND, a feedback pin FB, and a power pin V. Each of the first electronic switch Q1 and the second electronic switch Q2 includes a first terminal, a second terminal, and a third terminal. The first terminal of the first electronic switch Q1 is connected to the voltage input terminal Vin through the first inductor L1, and is connected to the voltage input terminal Vin through the first capacitor C1 and the first resistor R1 in that order, and is further grounded through the third capacitor C3. The second terminal of the first electronic switch Q1 is connected to the voltage output terminal Vout through the second inductor L2, and grounded through the second inductor L2 and the second capacitor C2 in that order. The third terminal of the first electronic switch Q1 is connected to the first control pin UGATE. The first terminal of the second electronic switch Q2 is connected to the second terminal of the first electronic switch Q1. The second terminal of the second electronic switch Q2 is grounded. The third terminal of the second electronic switch Q2 is connected to the second control pin LGATE, and grounded through the second resistor R2. The first detecting pin Sense+ is connected to a node between the first capacitor C1 and the first resistor R1. The second detecting pin Sense− is connected to the first terminal of the first electronic switch Q1. The boot pin BOOT is connected to the state pin PHASE through the fourth capacitor C4. The state pin PHASE is connected to the second terminal of the first electronic switch Q1. The ground pin GND is grounded. The feedback pin FB is connected to a node between the second inductor L2 and the second capacitor C2. The power pin V is connected to a direct current power supply Vcc, and grounded through the fifth capacitor C5.

Voltage of the voltage input terminal Vin is alternating current (AC) voltage. When the AC voltage is supplied to the first inductor L1, parasitic capacitance is generated by the first inductor L1. Voltage V1 across the first inductor L1 complies with the following formula (formula 1): $V1=Vz+Vs=Z*I1+S*L*I1=(Z+S*L)*I1$. In formula 1, Z stands for an equivalent impedance of the first inductor L1, Vz stands for the voltage across the equivalent impedance Z of the first inductor L1, L stands for an inductance of the first inductor L1, S stands for complex frequency domain coefficient, Vs stands for the voltage of the parasitic capacitance of the first inductor L1 and I1 stands for current of the first inductor L1.

Capacitive reactance Zc of the first capacitor C1 complies with the following formula (formula 2): $Zc=1/S*C$. In formula 2, S stands for complex frequency domain coefficient, and C stands for a capacitance of the first capacitor C1.

Voltage Vc of the first capacitor C1 complies with the following formula (formula 3): $Vc=V1*Zc/(Zc+R)$. In formula 3, V1 stands for voltage across the first inductor L1, Zc stands for capacitive reactance of the first capacitor C1, and R stands for a resistance of the first resistor R1.

According to formulas 1-3, the following formula (formula 4) can be obtained: $Vc=(Z+S*L)*I1*1/S*C/(1/S*C+R)=Vz*((S*L/Z+1)/(S*R*C+1))$.

In formula 4, if $(S*L/Z+1)/(S*R*C+1)=1$, then $Vc=Vz$. That is, if $R*C=L/Z$, the voltage Vz across the equivalent impedance Z of the first inductor L1 can be obtain by detecting the voltage Vc of the first capacitor C1 through the first detecting pin Sense+ and the second detecting pin Sense−.

In use, the controller 12 detects the voltage Vc of the first capacitor C1 through the first detecting pin Sense+ and the second detecting pin Sense−, and determines whether the current I1 ($I1=Vc/Z$) of the first inductor L1 is more than a preset value. If the current I1 of the first inductor L1 is more than the preset value, the controller 12 executes over-current protection. Therefore, the current I1 of the first inductor L1 can be controlled to be no more than the preset value, and current passing through the first electronic switch Q1 can be controlled in a normal operation current range accordingly. Furthermore, even if the second terminal of the first electronic switch Q1 is grounded directly by an incorrect operation, the controller 12 can detect that current is over the preset value, and executes the over-current protection timely, to prevent the first electronic switch Q1 from being damaged. The over-current protection falls within well-known technologies, and are therefore not described here.

In one embodiment, each of the first electronic switch Q1 and the second electronic switch Q2 is an n-channel metal-oxide semiconductor field-effect transistor (NMOSFET). The first terminal, the second terminal, and the third terminal of the first electronic switch Q1 are respectively a drain, a source, and a gate of the NMOSFET. The first terminal, the second terminal, and the third terminal of the second electronic switch Q2 are respectively a drain, a source, and a gate of the NMOSFET. In other embodiments, each of the first electronic switch Q1 and the second electronic switch Q2 may be a p-channel MOSFET, or a bipolar junction transistor, or other switch having similar functions.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A buck circuit, comprising:
a first inductor, a second inductor, a first capacitor, a second capacitor, a first resistor, a second resistor, a voltage input terminal, and a voltage output terminal;
a first electronic switch comprising:
   a first terminal connected to the voltage input terminal through the first inductor, and connected to the voltage input terminal through the first capacitor and the first resistor in that order;
   a second terminal connected to the voltage output terminal through the second inductor, and grounded through the second inductor and the second capacitor in that order; and
   a third terminal;
a second electronic switch comprising a first terminal connected to the second terminal of the first electronic switch, a second terminal grounded, and a third terminal; and
a controller comprising:
   a first detecting pin connected to a node between the first capacitor and the first resistor;
   a second detecting pin connected to the first terminal of the first electronic switch;
   a first control pin connected to the third terminal of the first electronic switch;
   a second control pin connected to the third terminal of the second electronic switch; and
   a state pin connected to the second terminal of the first electronic switch;
wherein relationship of capacitance C of the first capacitor, resistance R of the first resistor, inductance L of the first inductor, and equivalent impedance Z of the first inductor is $R*C=L/Z$; and
wherein the controller detects voltage of the first capacitor through the first detecting pin and the second detecting pin, determines whether current of the first inductor is more than a preset value according to the voltage of the first capacitor, and executes over-current protection in response to the current of the first inductor being more than the preset value.

2. The buck circuit of claim 1, further comprising a third capacitor, a fourth capacitor, and a fifth capacitor, wherein the first terminal of the first electronic switch is grounded through the third capacitor, the controller further comprises a boot pin connected to the state pin through the fourth capacitor, a power pin connected to a direct current power supply, a feedback pin connected to a node between the second inductor and the second capacitor, and a ground pin grounded, wherein the power pin of the controller is further grounded through the fifth capacitor.

3. The buck circuit of claim 1, wherein each of the first electronic switch and the second electronic switch is an n-channel metal-oxide semiconductor field-effect transistor (NMOSFET), the first terminal, the second terminal, and the third terminal of each of the first and second electronic switches are respectively a drain, a source, and a gate of the NMOSFET.

* * * * *